United States Patent [19]

Lauredan

[11] 4,180,595

[45] Dec. 25, 1979

[54] NUTRITIVE SEAMOSS COMPOSITION AND METHOD FOR PREPARING SAME

[76] Inventor: Bernier Lauredan, 224-02 Linden Blvd., Cambria Hgts., N.Y. 11411

[21] Appl. No.: 919,503

[22] Filed: Jun. 29, 1978

[51] Int. Cl.$^2$ .......................... A23L 1/04; A23L 2/00
[52] U.S. Cl. .................................. 426/575; 426/590; 426/580; 426/654
[58] Field of Search ............... 426/573, 575, 587, 590, 426/810, 592, 580, 654

[56] References Cited

U.S. PATENT DOCUMENTS

| | | | |
|---|---|---|---|
| 113,562 | 4/1871 | Rand | 426/575 |
| 256,129 | 4/1882 | Decastro | 426/587 |
| 2,060,336 | 11/1936 | Bear et al. | 426/575 |
| 2,476,581 | 7/1949 | Bloss | 426/590 |

FOREIGN PATENT DOCUMENTS 22968  8/1896  United Kingdom ..................... 426/587

*Primary Examiner*—Jeanette M. Hunter
*Attorney, Agent, or Firm*—Raymond N. Matson

[57] ABSTRACT

An edible seamoss composition containing water, gum arabic, dry linseed, seamoss, milk sweeteners and flavoring. The composition may be used as a base for stabilized drinks.

6 Claims, No Drawings

NUTRITIVE SEAMOSS COMPOSITION AND METHOD FOR PREPARING SAME

FIELD OF THE INVENTION

The present invention relates to a nutritive seamoss composition and method for preparing same, the composition including a blend of water, gum arabic, dry linseed, seamoss and sweetening and flavoring agents.

BACKGROUND OF THE INVENTION

Numerous attempts have been made in the prior art to prepare nutritive compositions. Typically, the resultant compositions are tasteless and lack human consumption appeal.

Attempts have also been made to incorporate seamoss, a nutritive ingredient, into foods for human consumption. Typically, the addition of seamoss serves merely to stabilize compositions such as chocolate milk and the like. These additions are limited for stability and are not included to serve as the basis for a nutritive composition for human consumption.

SUMMARY OF THE INVENTION

Generally stated, the present nutritive seamoss composition includes in combination, water, gum arabic, dry linseed, seamoss, at least one sweetening agent and at least one flavoring agent.

In the method of the present invention, water, gum arabic, dry linseed and seamoss are first combined and heated to boiling until a slightly brown texture is obtained. Thereafter, the blend is filtered to remove undissolved solids. Milk and the sweetening agent as well as the flavoring agent may be then included to produce the nutritive seamoss composition of the present invention. The present composition may be prepared and canned, bottled or processed as an anhydrous instant product by conventional means well known to the freeze-dried or instant food processing art.

It is an object of the present invention to provide a seamoss composition which is high in nutritive values.

It is also an object of the present invention to provide a method for preparing a stable, tasty seamoss composition suitable for human consumption.

It is yet another object of the present invention to provide a new, improved nutritive composition prepared using seamoss, water, gum arabic, dry linseed, and sweetening and flavoring agents.

These objects as well as additional object and advantages will become more apparent from the following more detailed description of the preferred embodiments.

DETAILED DESCRIPTION OF THE PREFERRED EMBODIMENTS

The present nutritive seamoss composition generally includes water, arabic gum, dry linseed, Irish moss, sweeteners and flavoring.

Water which serves as a basis for formulating the present composition is added in an amount of 100 parts by weight.

For each 100 parts by weight of water, arabic gum is added in an amount from about 0.5 to about 0.8 part by weight and desirably from about 0.6 to about 0.7 part by weight.

For each 100 parts by weight of water, dry linseed or flaxseed may be also added in an amount from about 0.5 to about 0.8 part by weight and desirably from about 0.6 to about 0.7 part by weight.

For each 100 parts by weight of water, seamoss, desirably as Irish moss, may be added in an amount from about 1.0 part to about 1.6 parts by weight and desirably from about 1.2 parts to about 1.4 parts by weight.

Although seamoss is generally referred to in the present context, it will be appreciated that Irish moss and similar marine vegetable matter may be used herein such as agar, kelp, algins, alginates, and the like.

Milk may also be included in the present composition in the form of condensed milk, sweetened or unsweetened, non-fat dry milk, or various commercially forms of milk as desired. Milk is added in an amount of about 10 to about 40 parts by weight per 100 parts of water when condensed, or equivalent amount thereof when powdered or whole milk. Preferably, an amount of about 15 to about 30 parts by weight of condensed milk is included per 100 parts by weight of water.

Sweetening agents may be included to suit taste preferences. Typically, sugar is the normally used sweetening agent herein although sugar substitutes which are commercially available may be included if desired.

The amount of sweetening agent included on the basis of water in the present formulation when sugar is used varies from about 5 to about 20 parts by weight and preferably from about 8 to about 15 parts by weight. Sugar substitutes may be included proportionally and consistent with taste preferences.

Stout, a by-product of beer processing, may be included in the present formulation in an amount from about 0.5 parts by weight to about 0.8 parts by weight and preferably from about 0.6 to about 0.7 parts by weight, water basis. One source of stout is Guiness Harp Corporation, New York, New York.

Flavoring agents may be added in amount to suit preferences of taste. Useful flavoring agents include salt, nutmeg, cinnamon, vanilla, rum and the like. For each 100 parts by weight of water, the flavoring agents may be included in amounts of about 1.5 to about 1.6 parts by weight and desirably about 1.2 to about 1.4 parts by weight. The flavoring agents may be added either separately or preferably in combination.

Salt, for example, as are the other ingredients used herein, may be added or salt derivatives such as disodium phosphate or the like can also be used if desired.

Artificial color may be added as desired using colors certified for human consumption.

The following example illustrates practice of the present invention in greater detail. In the example, as well as in the specification generally, all parts are given by weight unless indicated otherwise.

EXAMPLE

Water, taken in an amount of 100 parts by weight to serve as a basis for additions of the remaining ingredients, was combined with 0.65 part by weight gum arabic, 0.65 part by weight dry linseed, and 1.3 parts by weight Irish moss. The blended ingredients were heated to boiling until a slightly brown, textured liquid resulted. The textured liquid was filtered to remove non-dissolved solids which were found to be typically linseed particles and Irish moss. This blend was found to be slightly tasteless. Thereafter, sugar in an amount of 10 parts by weight was combined with 20 parts by weight of milk. This blend was mixed into the filtered ingredients and a product resulted which lacked stability. The blend could only sustain eight days refrigeration or 24 hours at room temperature. The product was noted to lack taste.

Following the milk-sugar addition, a further flavoring agent addition was made comprising salt 0.2 part by weight; nutmeg 0.1 part by weight; cinnamon 0.05 part by weight; and vanilla 0.4 part by weight. Thereafter, 10 parts stout combined with 0.4 part by weight rum were added and the product blended to uniform consistency.

The product was found to be a delicious natural drink stabilized over 3–4 weeks when refrigerated while being a highly nutritive seamoss composition.

It will be apparent to those skilled in the art that various changes may be made in practice of the present invention disclosed without departing from the invention disclosed in the specification and claims.

What is claimed is:

1. An edible seamoss composition which comprises in combination, water, gum arabic, dry linseed, seamoss, a sweetening agent and a flavoring agent, wherein the seamoss is Irish moss present in an amount of about 1.0 parts to about 1.6 parts by weight per 100 parts water, gum arabic is present in an amount from about 0.5 to about 0.8 parts by weight per 100 parts water, dry linseed is present in an amount from about 0.5 to about 0.8 parts by weight per 100 parts water, milk is additionally added in an amount of about 10 to about 40 parts by weight per 100 parts of water, the sweetening agent is added in an amount from about 1.5 to about 1.6 parts by weight per 100 parts water, and the flavoring agent is added in an amount of about 5 to 20 parts by weight per 100 parts by weight water.

2. The seamoss composition of claim 1 wherein Irish moss is present in an amount of about 1.2 parts to about 1.4 parts by weight, gum arabic is present in an amount from about 0.6 to about 0.7 parts by weight, dry linseed is present in an amount from about 0.6 to about 0.7 part by weight, milk is present in an amount of about 15 to about 30 parts by weight, the sweetening agent is present in an amount of about 8 to about 15 parts by weight, and the flavoring agent is present in an amount of about 1.2 to about 1.4 parts by weight, and wherein the composition further includes about 0.5 part to about 0.8 part by weight stout.

3. The seamoss composition of claim 1 wherein the sweetening agent is sugar, and the flavoring agent includes salt, nutmeg, cinnamon, vanilla, stout and rum.

4. A method for preparing an edible seamoss composition which comprises,
   (A) blending water, gum arabic, dry linseed and seamoss;
   (B) boiling the ingredients of Step A until a slightly brown texture is obtained;
   (C) filtering non-dissolved ingredients;
   (D) blending milk and a sweetening agent;
   (E) combining the filtered product of Step C with the blend of Step D; and
   (F) adding a flavoring agent to the blend of Step E;
   wherein the seamoss is Irish moss present in an amount of about 1.0 parts to about 1.6 parts by weight per 100 parts water, gum arabic is present in an amount from about 0.5 to about 0.8 parts by weight per 100 parts water, dry linseed is present in an amount from about 0.5 to about 0.8 parts by weight per 100 parts water, milk is additionally added in an amount of about 10 to about 40 parts by weight per 100 parts of water, the sweetening agent is added in an amount from about 1.5 to about 1.6 parts by weight per 100 parts water, and the flavoring agent is added in an amount of about 5 to 20 parts by weight per 100 parts by weight water.

5. The method of claim 4, wherein Irish moss is present in an amount of about 1.2 parts to about 1.4 parts by weight, gum arabic is present in an amount from about 0.6 to about 0.7 part by weight, dry linseed is present in an amount from about 0.6 to about 0.7 part by weight, milk is present in an amount of about 15 to about 30 parts by weight, the sweetening agent is present in an amount of about 8 to about 15 parts by weight, and the flavoring agent is present in an amount of about 1.2 to about 1.4 parts by weight, and wherein the composition further includes about 0.5 part to about 0.8 part by weight stout.

6. The method of claim 4 wherein the sweetening agent is sugar, and the flavoring agent includes salt, nutmeg, cinnamon, vanilla, stout and rum.

* * * * *